July 12, 1927.  1,635,459
P. A. CHAMBERLAIN
RADIOCONDENSER
Filed Sept. 18, 1925
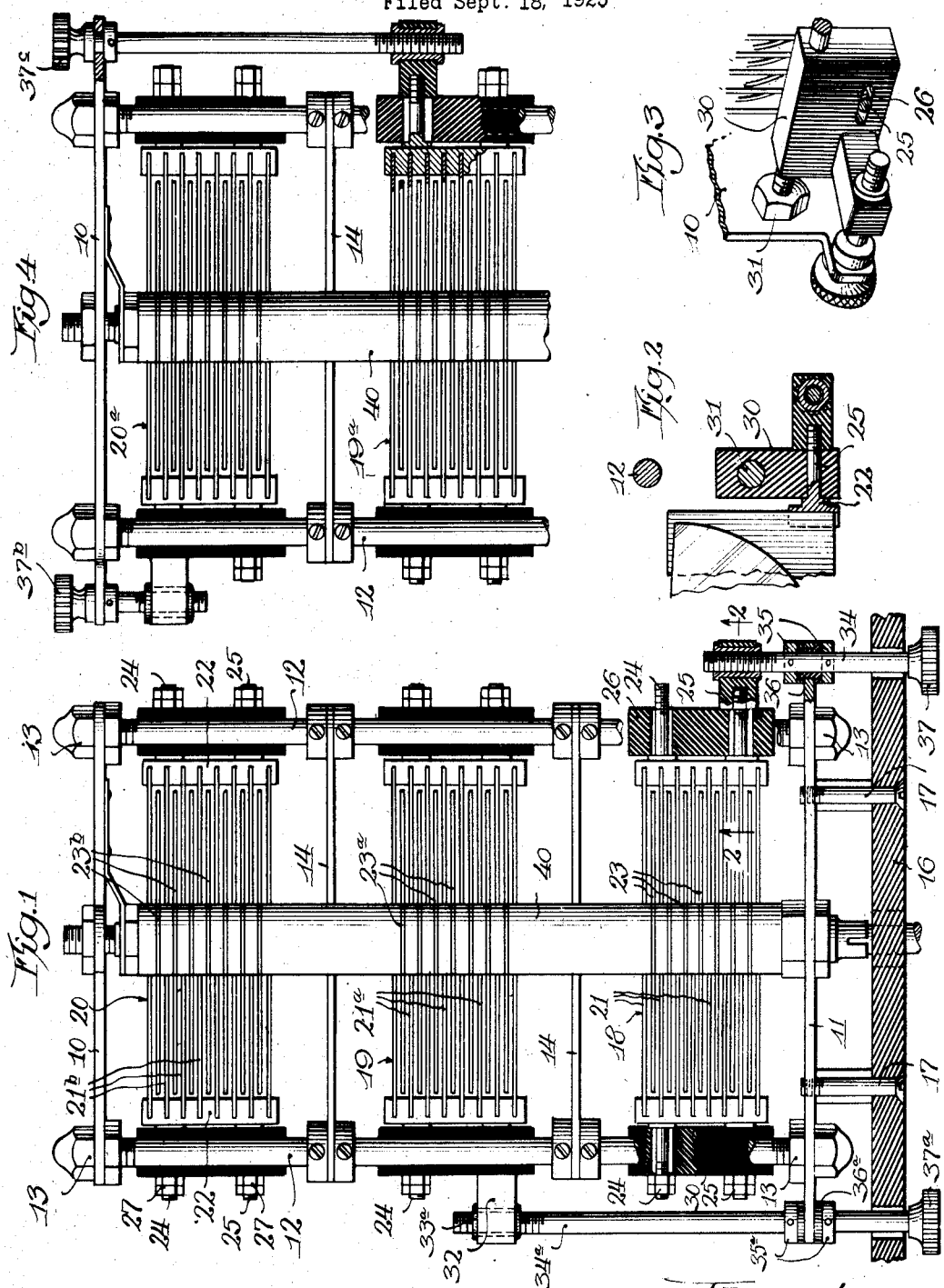
Witness:
Chas. R. Foursh.
Inventor,
Paul A. Chamberlain
Offield Melhope Scott & Poole
Attys Patented July 12, 1927.

1,635,459

UNITED STATES PATENT OFFICE.

PAUL A. CHAMBERLAIN, OF CHICAGO, ILLINOIS, ASSIGNOR TO MOHAWK ELECTRIC CORPORATION, OF CHICAGO, ILLINOIS, A CORPORATION OF ILLINOIS.

RADIOCONDENSER.

Application filed September 18, 1925. Serial No. 57,050.

The invention relates to improvements in multiple circuit controlling devices for radio apparatus, and more particularly to condensers adapted for use in multiple circuits and has for its principal object, to provide an improved form of apparatus of the class described, in which two or more condenser units, each coupled in a separate circuit, as, for instance, in successive amplification stages of a radio receiving or sending set, may be all adjusted and their respective circuits balanced by exterior and readily accessible adjusting members, so as to afford simultaneous control of the circuits by manipulation of a single controlling member.

More specifically, this invention is an improvement over the construction disclosed in prior application of Paul A. Chamberlain, Serial No. 723,617, filed July 2, 1924, Patent No. 1,573,374, Feb. 16, 1926, in which condenser apparatus of the class above described is broadly disclosed and comprises a composite variable condenser member made up of a plurality of condenser units arranged in alignment with each other and controlled by rotor members on a common shaft. Each of the condenser units is connected with separate circuits to be tuned, the arrangement shown herein being especially adapted for tuning the secondary or grid circuits of the successive amplification stages. Each of these condenser units comprises insulated stator members connected in the respective tuned circuits while the rotor units are mounted on a common shaft connected to a ground common to all the circuits so as to vary simultaneously the respective capacities of the condenser units in the several circuits when the rotor is rotated. The specific form of balancing and adjusting devices disclosed comprise a series of shield members or plates electrically connected with the common rotor elements for adjustment between adjacent stator members of the separate condenser units.

In the present invention I disclose an improved means for balancing the several condenser units with respect to each other, which consists in independently moving the bank of stator plates bodily with respect to the rotor plates.

The invention may best be understood by reference to the accompanying drawings in which Figure 1 is a top view of one form of condenser constructed in accordance with my invention.

Figure 2 is a detailed section taken on line 2, 2, of Figure 1.

Figure 3 is a detailed view in perspective of one of the adjusting devices shown in Figures 1 and 2.

Figure 4 is a fragmentary top view showing a modified form of adjusting means.

Referring now to details shown in the drawings, illustrating a condenser made up of three units; this condenser comprises a frame having metal end plates 10 and 11 and a pair of oppositely disposed connecting rods 12, 12, extending between the upper corners of the end plates 10 and 11 and secured thereto by suitable means such as nuts 13, 13. The structure is provided with three condenser units 18, 19 and 20. The first unit 18 consists of a structure made up of a plurality of parallelly disposed plates 21, 21, spaced apart, and a rotor element made up of a plurality of plates 23, 23, interposed between adjacent stator plates. The rotor plates are mounted on a shaft 40 which is common with the rotor plates of the other condenser units 19 and 20. A plurality of shielding plates 14, 14, are mounted on the frame between each pair of condenser units, said plates being supported on bars 12, 12, so as to be electrically connected through the metal end plates to the rotor which is preferably connected to ground, when used in the apparatus. This construction therefore affords the desired electrostatic isolation of the separate condenser units. The entire condenser frame may be suitably mounted upon a panel 16, as for instance, by screws 17, 17.

Referring now to the means of mounting and adjusting the stator plates 21, 21 of condenser unit 18, it will be observed that the marginal edges of these plates are secured to a common supporting bar 22 provided with one or more laterally extending studs, such as members 24 and 25, at each side of the condenser units, and extending through slots 26, 26 in insulator blocks 30, 30. One or more of these studs may be used for terminals of the stator. The blocks 30, 30 are suitably supported on the frame of the condenser, as, for instance, by rods 31, 31. The slots 26 extend longitudinally of the condenser frame so as to permit longitudinal adjustment of the bank of stator plates 21, 21.

In the form shown herein the studs 24 and 25 at the left side of unit 18 are secured by nuts 27, 27, threaded thereon and engaging the outer face of the insulator blocks 30, 30. By loosening these nuts at either side, the stator bank may be shifted longitudinally so as to vary the distance between the stator plates and the rotor plates of its respective unit, and thus vary its capacity. Closer means of adjustment control is afforded by means of a thumb screw adjusting device, herein shown as applied to one side of the condenser unit. This adjusting device comprises a lug 32 threaded on one of the projecting studs, as, for instance, the stud 25 at the right hand side of condenser unit 18, which extend beyond the surface of insulating block 30. This lug is provided with a bushing 33 having a shaft 34 threaded therein, said shaft being arranged with its axis parallel with the longitudinal axis of the condenser and having suitable bearing on the condenser frame, as, for instance, by a pair of collars 35, 35, engaging opposite sides of a bushing 36 mounted at one side of the end plate 11. In the form shown in Figure 1 shaft 34 extends through the panel 16, and is provided at its outer end with a turning knob 37. Means are provided for insulating the adjusting device, as, for instance, the stud 32 and bushing 36 are formed of suitable insulating material.

Under ordinary conditions I find that sufficient adjustment may be afforded by means of a single adjusting device applied to one side of the rotor bank, as shown, but manifestly a similar device may be utilized on the opposite side, if desired.

Referring now to the second condenser unit 19, the same consists of stator plates 21$^a$ and rotor plates 23$^a$ similar in construction to the rotor plates 21 and 23 respectively of the first condenser unit 18. Similar means of longitudinal adjustment of the stator bank in insulated blocks 30, 30 is also afforded by means of parts 32$^a$, 33$^a$, 34$^a$, 35$^a$ and 36$^a$ similar to the respective parts 32 to 36, associated with the unit 18, excepting that it is preferable to provide the manual adjustment means on the side of the condenser frame opposite the manual adjustment means on the first condenser unit 18. In this manner the two adjusting shafts 34 and 34$^a$ and manual adjusting knob may be extended along opposite sides and beyond the end of the condenser frame without interference with each other. In the case of a three unit condenser such as shown in Figure 1, it will be understood that manually adjusting devices are wired only for two of the units, such as units 18 and 19. In this case the last named units being independently placed with respect to the third unit 20 after the condenser has been placed in circuit and the apparatus is substantially complete. It will be further understood that my invention may be applied to a condenser including any number of separate banks or units and the desired balancing adjustment may be afforded by adjusting means applied to all but one of said units.

In the modified form shown in Figure 4 similar adjusting means are provided for shifting the stator plates of banks 19$^a$ and 20$^a$ longitudinally, but in this case the adjusting knobs 37$^b$ and 37$^c$ do not extend through the front panel but are mounted directly on the rear end plates of the frame. In this form a bushing similar to pushing 36 and 36$^a$ shown in Figure 1 are omitted.

A condenser constructed as above described is particularly adapted for use in radio frequency amplification circuits for tuning the grid circuits of successive stages, but may be equally applicable to any circuits in which it is desirable to provide a single controlling device for varying the capacity of several synchronized or balanced circuits. In practice the separate condenser units such as 18, 19, and 20 may be given a rough adjustment so as to have substantially equal capacities, this rough adjustment being afforded by shifting the rotor banks at both ends thereof, so as to be substantially parallel with the plates of the stators. The final adjustment is made after the set has been completed and the effects of interstage capacity and magnetic coupling has been established, this final adjustment being accomplished by means of the screw adjustment device, although in some instances it may be necessary to give further adjustment of both sides of one or more of the stator units by unloosening nuts 27, 27, on the side of the rotor opposite the adjusting device.

Among the advantages of shifting the stator banks longitudinally as described is that it permits all the stator units to be maintained in longitudinal alignment and thus be all maintained in proper axial positions with respect to the rotor elements in all angular positions of the latter. By reason of the provision of the shielding plates 14, 14, the shifting of stator units toward and away from each other during the final adjustment has no effect in increasing or decreasing the mutual capacities of adjacent units due to intercapacity coupling therebetween. The shields therefore make it possible to adjust each stator unit independently, without throwing an adjacent unit out of balance and thus requiring further readjustment.

I claim:

1. A condenser comprising a frame, a plurality of stator units insulated from each other and spaced longitudinally of said frame, a rotor electrically common with said frame, means for independently shifting said stator units on said frame longitudinally of the axis of said rotor, and manual control means projecting beyond said frame and operatively connected to said last named means.

2. A condenser comprising a frame, a plurality of stator units insulated from each other and spaced longitudinally of said frame, a rotor electrically common with said frame, means conductively connected with said rotor and interposed between adjacent stator units for shielding said units from effects of intercapacity coupling therebetween, means for independently shifting said stator units on said frame longitudinally of the axis of said rotor, and manual control means for said shafts disposed beyond one end of said frame.

3. A condenser comprising a frame, a plurality of stator units insulated from each other and spaced longitudinally of said frame, a rotor common to all of said stator units, means for independently shifting said stator units on said frame longitudinally of the axis of said rotor, comprising one or more threaded shafts arranged longitudinally of said frame and each connected between the latter and its respective stator, for moving the latter in a direction substantially parallel to the axis of said rotor, and manual control means for said shafts disposed beyond one end of said frame.

4. In a device of the character described, a condenser provided with a pair of relatively rotatable capacity elements, one of said elements comprising a plurality of aligned units insulated from each other, the other of said elements comprising a series of cooperating units in longitudinal alignment with each other to afford substantially uniform variation of capacities of the respective insulated units when rotated respective thereto, guide means affording independent adjustment of said insulated units relative to said cooperating units in a direction parallel with the axis of rotation of said capacity elements, and manual control means for said guide means extending to a position remote from said insulated units.

5. A condenser having a frame, a plurality of units each consisting of a stator and a rotor, said rotors all being mounted on a common shaft and arranged to overlap substantially equal segments of their respective stators in all permissible positions thereof, means affording independent adjustment of said stators in a direction parallel with the axis of said rotor shaft, and manual control means for said adjusting means disposed beyond a portion of said frame to shield the stators from effects of body capacity while being adjusted.

6. A condenser having a frame, a plurality of units each consisting of a stator and a rotor, said rotors all being mounted on a common shaft electrically common with said frame and arranged to overlap substantially equal segments of their respective stators in all permissible positions thereof, means conductively connected with said rotor and interposed between said adjacent stators for shielding the same from effects of intercapacity coupling, means affording independent adjustment of said stators in a direction parallel with the axis of said rotor shaft, and manual control means for said last named means disposed beyond a portion of said frame to shield the stators from effects of body capacity while being adjusted.

Signed at Chicago, this 15th day of September, 1925.

PAUL A. CHAMBERLAIN.